(12) United States Patent
Izumida et al.

(10) Patent No.: US 6,914,741 B2
(45) Date of Patent: Jul. 5, 2005

(54) SERVO WRITER

(75) Inventors: Takahisa Izumida, Kanagawa (JP); Akihiro Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 64 days.

(21) Appl. No.: 10/701,074

(22) Filed: Nov. 5, 2003

(65) Prior Publication Data

US 2004/0141251 A1 Jul. 22, 2004

(30) Foreign Application Priority Data

Nov. 7, 2002 (JP) ........................................ 2002-323353

(51) Int. Cl.[7] .............................................. G11B 15/52
(52) U.S. Cl. ...................... 360/73.11; 360/71; 360/74.3
(58) Field of Search .............................. 360/69, 70, 71, 360/73.01, 73.04, 73.08, 73.09, 73.11, 74.1–74.3; 242/334–334.6, 352.2, 412.2, 413.5

(56) References Cited

U.S. PATENT DOCUMENTS 4,429,261 A * 1/1984 Ohno ............................ 318/6
4,497,459 A * 2/1985 Yoshino et al. .......... 242/334.3

FOREIGN PATENT DOCUMENTS

JP 2001-167493 A 6/2001

* cited by examiner

Primary Examiner—David Hudspeth
Assistant Examiner—Jason Olson
(74) Attorney, Agent, or Firm—Sughrue Mion, PLLC

(57) ABSTRACT

A servo writer which writes a servo mend on a tape by the write head is characterized by being equipped with a pay-off side motor paying off the tape from tie payoff reel by rotating the pay-off reel; a winding side motor winding the tape on the winding reel by rotating the winding reel; a first capstan roller and second capstan roller which are provided at an upstream side and down stream side of the write head, respectively, and by rotating the capstan rollers, run the tape in a state pinched between respective pinch rollers and the capstan rollers; a first tension detector which is provided between the first capstan roller and second capstan roller and detects running tape tension; and a capstan roller controlling unit controlling a rotation speed of the first capstan roller and second capstan roller so that tension detected by the tension detector becomes constant.

20 Claims, 4 Drawing Sheets

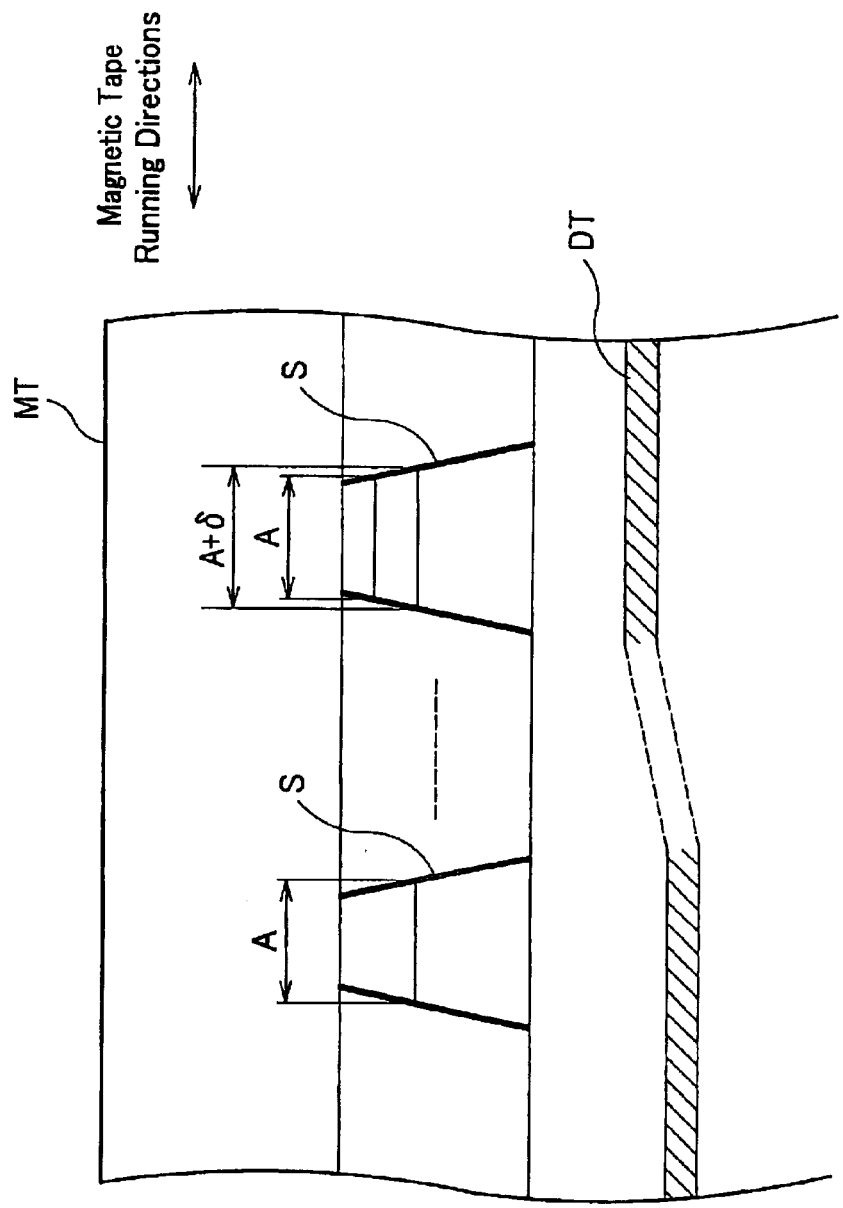

SERVO WRITER

FIELD OF THE INVENTION

The present invention relates to a servo writer to write servo signals on a magnetic tape.

BACKGROUND OF THE INVENTION

Generally, a magnetic tape is widely used as the tape to record and keep information. A problem to make high density of the magnetic tape exists in how to increase recording density of information per unit area. Therefore, for example, although making a width of a single data track in which data is written as small as possible in a tape width direction, thereby mag a number of data tracks more (improvement of line density), and a substantial increase of a recording capacity is intended, there exists a limit only relying on machine accuracy of running device of a magnetic tape because it becomes difficult for a reproduce head to completely trace the data tracks when reproducing recorded signals in case of making the width of the data tracks small in the tape width direction.

On the other hand, in a recent high-density magnetic tape, a servo control mechanism has become to been built in, adding to a similar improvement of running device of a conventional magnetic tape. The servo control mechanism is designed to be able to completely trace data tracks on a magnetic tape by controlling a record head and reproduce head for a running magnetic tape.

In order to utilize servo control, firstly write servo signals on a magnetic tape using it in advance. Then, control a write head and reproduce head of a magnetic tape drive in positions of data tracks recording data with standardizing servo signals. Thus, high density by making a width of a data track in a tape width direction becomes possible.

Although there exist various formats as the servo signals, a system called a timing based servo recognizing a magnetic head position at a timing when pulses appear in read servo signals is known.

In a magnetic tape system using such the timing based servo system, it is important to accurately write servo signals on a magnetic tape. That is, the timing based servo assumes that the servo signals are accurately written, so unless they are written at an accurate timing (interval), there exist a possibility that track positions are mistaken with a magnetic tape drive.

Therefore, in order to write the servo signals at an accurate timing, with running the magnetic tape at a constant accurate speed, a exclusive device called a servo writer writing the servo signals with a fixed servo signal write head (hereinafter simply referred to as "write head") is used.

Here, in order to run a magnetic tape, constant tension has to be given to the magnetic tape. Therefore, a servo writer keeps the magnetic tape tension constant feedback-controlling by a tension adjusting means, however operation for tension adjustment of the tension abusing means gives the magnetic tape small vibration, thereby accurately the servo signals being impeded.

As a prior technical document described about such the tension adjusting means, for example, see FIGS. 4, 5, and the like in Japan paten laid open publication 2001-167493.

The tension adjustment described above is generally thought to be better to detect tension deviation as soon as possible and to control a capstan and the like so as to early modify the tension, however in the case of a magnetic tape the tape itself is an elastic body and expands, thereby the tape being unable to follow if early controlled over a certain degree. Accordingly, in a current tape, it is near a limit to accurately write the servo signals by early performing feedback control.

In addition, although the magnetic tape vibration is due to the feedback control, an inconveniency occurs in some cases on the contrary if small deviation in the servo signals written on the magnetic tape occurs by early performing the feedback control of the tape tension. That is, in the magnetic tape drive, because in the case that data is recorded with a magnetic head being controlled as instructed by erroneously written servo signals, the magnetic head operates also in reproducing data same as in recording data, notwithstanding eventually data tracks being formed bent, there exists no problem thanks to the data tracks being able to be traced in reproducing. However, when the servo signals are written on the magnetic tape with a drastic timing error (change) which the magnetic head cannot follow, the magnetic head cannot always operate same in reproducing data and recording data and it causes an off-track (derailing of the reproduce head from a data track)

SUMMARY OF THE INVENTION

An exemplary object of the present invention is, in a magnetic tape drive controlling magnetic head positions using servo signals, to provide a servo writer to write the servo signals, which is not apt to cause a recording/reproducing error of data, in a magnetic tape.

To realize the object, a servo writer of the invention writes servo signals by a write head on a tape which is paid off from a pay-off reel provided at an upstream side of the write head and is wound on a winding reel provided at a downstream side of the write head, and is characterized by being equipped with a paying-off side motor paying off the tape from the pay-off reel by rotating it; a winding side motor winding the tape on the winding reel by rotating it; a first capstan roller and second capstan roller, which are respectively provided at the upstream side and downstream side of the write head, running the tape by rotating the capstan rollers in a state that the tape is pinched between respective pinch rollers and the capstan rollers; a tension detecting means provided between the first capstan roller and second capstan roller, and detecting tension of the running tape; and a capstan roller control unit controlling a rotation speed of the first capstan roller and second capstan roller so as to keep the tension constant detected by the tension detecting means, wherein the capstan roller control unit has a low pass filter attenuating high frequency components of tension signals detected by the tension detecting means.

Such the servo writer passes the tension signals detected by the tension detecting means through the low pass filer, thereby attenuating the high frequency components. Then, based on signals after the high frequency components being attenuated, the servo writer controls the first/second capstan rollers to keep the tape tension constant. Therefore, variations of the tape tension becomes only moderate ones not more than a certain frequency, and distortion (a change and/or deviation of a timing) of the servo signals written on the tape by the write head also becomes moderate. Accordingly, when recording data in the tape drive, movement of the magnetic head can follow the distortion of the servo signals, thereby data tracks being formed corresponding to it. In addition, in reproducing data same as in recording, the magnetic head is controlled corresponding to the distortion of the servo signals. That is, in recording/ reproducing of magnetic tape data, there practically exists no influence, thereby recording/reproducing errors attributable to writing errors being able to be prevented. Meanwhile, a tension signal is a signal meaning tension, and as measurement values, various ones such as a current, voltage, and pressure values may be used.

In the servo writer, the tension detecting means can be composed so that the magnetic tape tension is detected by a negative pressure in a vacuum chamber by pulling the tape in it.

Moreover, in the servo writer, a cutoff frequency of the low pass filer is desirable to be lower than a response frequency by which a head in the tape drive, in which the tape is used, is driven corresponding to servo signals. For example, the cutoff frequency of the low pass filer is preferable to be adjusted not less than 100 Hz and not more than 150 Hz.

According to such the constitution, a head of the tape drive can follow the servo signals and when recording/reproducing data in the tape drive, errors due to the distortion of the servo signals can be prevented.

BRIEF DESCRIPTION OF THE DRAWINGS

FIG. 3 is a drawing of servo signals and a data track on a magnetic tape.

DESCRIPTION OF THE PREFERRED EMBODIMENTS

Hereinafter, one of embodiments of the present invention will be described in detail, referring to drawings as needed.

Figure 1:
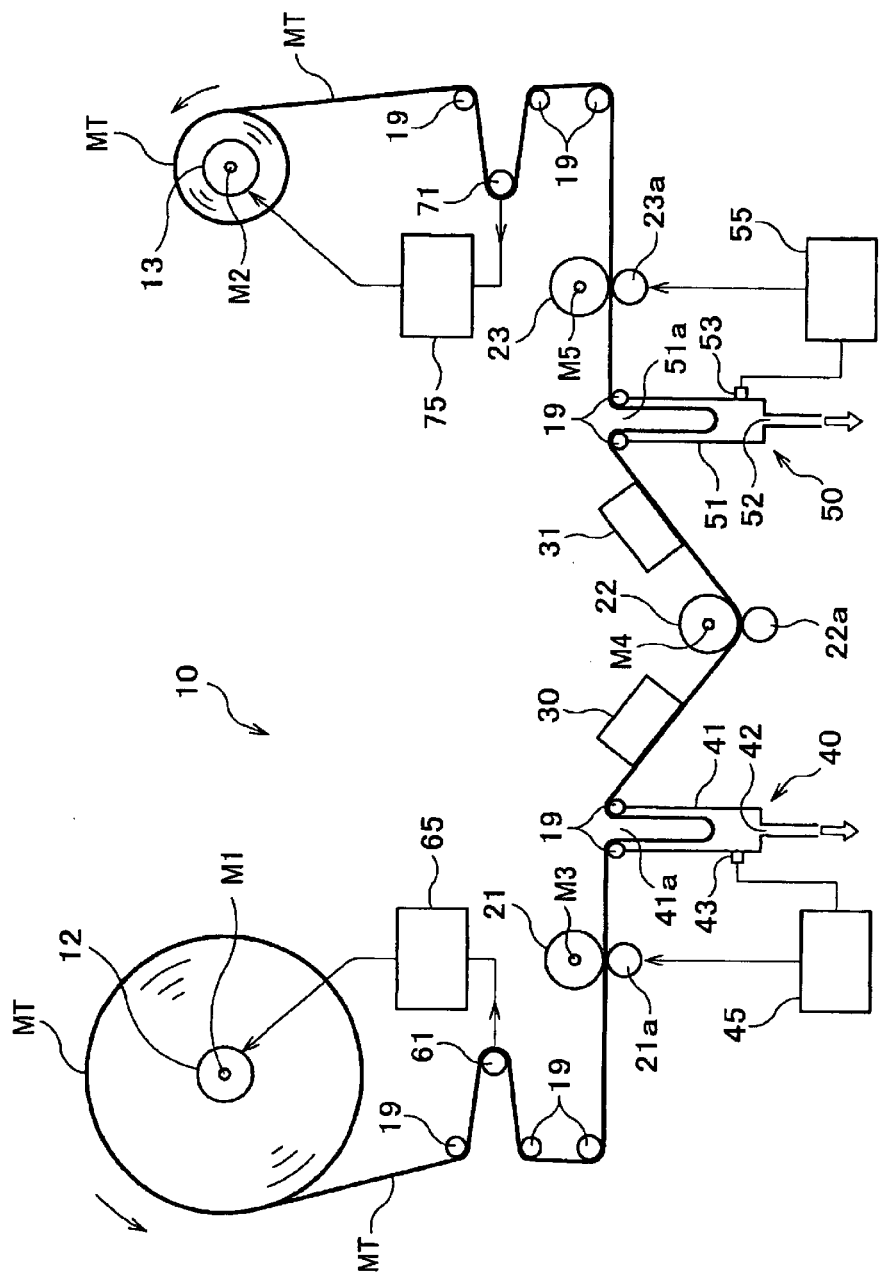
FIG. 1 is a configuration drawing conceptually showing a servo writer related to the invention.

As shown in FIG. 1, a servo writer 10 is equipment to pay off a magnetic tape MT from a pay-off reel 12 provided at an upstream side of a write head 30, guide a running direction of the magnetic tape MT by many guide rollers 19, and wind the tape MT on a winding reel 13 provided at a downstream side of the write head 30 after writing servo track signals (hereinafter referred to as servo signals) with the write head 30.

At an upstream side of the write head 30 is provided a first capstan roller 21 and at a downstream side is provided a second capstan roller 22. Between the first capstan roller 21 and write head 30 is provided a first tension detecting device 40 adjusting tension of the magnetic tape MT. The first tension detecting device 40 corresponds to a tension detect means in claims of the invention. In addition, the first capstan roller 21 corresponds to a first capstan roller and the second capstan roller 22 corresponds to a second capstan roller in claims of the invention.

At a downstream side of the second capstan roller 22 are in turn provided an inspection head 31, a second tension detecting device 50 adjusting the tension of the magnetic tape MT, and a third capstan roller 23.

The pay-off reel 12 is the reel of which circumference is wound by the magnetic tape MT on which the servo signals are not written. The pay-off reel 12 pays-off the tape MT by being rotated at a predetermined speed with a paying-off side servo motor (paying-off side motor) M1.

The winding reel 13 is the reel to wind the tape MT, on which the servo signals have been written, on a circumference. By being rotated at a predetermined speed with a winding side servo motor M2, the winding reel 13 winds the tape MT, on which the servo signals have been written, on the circumference.

The first capstan roller 21 is rotationally driven by a first capstan motor M3. In addition, the first capstan roller 21 pinches the tape MT between a pinch roller 21a and itself, and rolls with the pinch roller 21a each other. Accordingly, by rotating the first capstan roller 21 with the first capstan motor M3, the tape MT runs being pinched by the first capstan roller 21 and pinch roller 21a.

The second/third capstan rollers 22 and 23 are, similarly to the first capstan roller 21, rotationally driven by a second capstan motor M4 and third capstan motor M5 and run the tape MT pinching it between pinch rollers 22a/23a and their respective capstan rollers.

Thus, because the tape MT is pinched by the first/second/third capstan rollers 21, 22, and 23 and the pinch rollers 21a, 22a, and 23a, respective tension is separated between the pay-off reel 12 and first capstan roller 21, between the second capstan roller 22 and third capstan roller 23, and between the capstan roller 23 and winding reel 13.

At an upstream of the first capstan roller 21, a tension detecting roller 61 supported by a tension arm not shown in the drawing is provided. The tape MT between the pay-off reel 12 and first capstan roller 21 is detected by the tension detecting roller 61 and controlled at predetermined tension with a rotation speed of a paying-off side servo motor M1 being controlled by a paying-off side servo motor control unit 65.

At a downstream of the third capstan roller 23, a tension detecting roller 71 supported by a tension arm not shown in the drawing is provided. The tape MT between the third capstan roller 23 and winding reel 13 is detected by the tension detecting roller 71 and controlled at predetermined tension with a rotation speed of a winding side servo motor M2 being controlled by a winding side servo motor control unit 75.

A first capstan motor M3 is a spindle motor supporting a rotation shaft by an air pressure without contact and eccentricity (for example, no eccentricity even at a side pressure of 3.5 kgf/cm2, (34.3 kPa)), and rotationally drives the first capstan roller 21. The first capstan motor M3 is variably controlled in its rotation speed by a first capstan roller control unit 45. Meanwhile, the first capstan roller control unit 45 corresponds to a capstan roller control unit in claims of the invention.

A second capstan motor M4 is a spindle motor supporting a rotation shaft by an air pressure without contact and eccentricity (for example, no eccentricity even at a side pressure of 3.5 kgf/cm2, (34.3 kPa)), and rotationally drives the second capstan roller 22 at a constant angular rate.

A third capstan motor M5 is a spindle motor supporting a rotation shaft by an air pressure without contact and eccentricity (for example, no eccentricity even at a side pressure of 3.5 kgf/cm2, (34.3 kPa)), and rotationally drives the third capstan roller 23. The third capstan motor M5 is variably controlled in its rotation speed by a third capstan roller control unit 55.

The first tension detecting device 40 is provided between the first capstan roller 21 and write head 30. The first tension detecting device 40 is equipped with a vacuum chamber 41 of a rectangular box with an opening 41a at an upper side, a discharge outlet 42 provided at a lowest portion of the vacuum chamber 41, a pressure gauge 43 provided on a lower side wall, and guide rollers 19 provided at both sides of the opening 41a.

In the vacuum chamber 41, air is suited from the discharge outlet 42 by a discharge pump not shown in the drawing. Being on the way transported to the write head 30 from the first capstan roller 22, the magnetic tape MT is sucked in the vacuum chamber 41 by a predetermined length from the opening 41a. Meanwhile, a lower end of the tape MT sucked in the chamber 41 is positioned higher than the pressure gauge 43.

The pressure gauge 43 measures a space pressure under the tape MT in the chamber 41 and outputs the measured pressure signal (pressure signal Ps) to the first capstan roller controlling unit 45.

Details of the first capstan roller controlling unit 45 will be described later and a basic function is firstly described. The first capstan roller control unit 45 monitors a pressure measured with the pressure gauge 43 and controls a speed of the first capstan roller 21 so that the pressure become constant. That is, when the tension of the tape MT increases, a position of lower end of the tape MT in the vacuum chamber 41 rises, thereby the pressure measured with the pressure gauge 43 being decreased and the speed of the first capstan roller 21 being increased so as to weaken the tension of the tape MT. On the contrary, when the tension of the tape MT decreases, the position of lower end of the tape MT in the vacuum chamber 41 is lowered, thereby the pressure measured with the pressure gauge 43 being increased. Therefore, the first capstan roller controlling unit 45 decreases the speed of the first capstan roller 21 so as to increase the tension of the tape MT.

Thus, the tape MT between the first capstan roller 21 and second capstan roller 22 is controlled constant in tension.

A second tension detecting device 50 is composed same as the first tension detecting device 40. The second tension detecting device 50 is provided between the inspection head 31 and third capstan roller 23. The detecting device 50 is equipped with a vacuum chamber 51 which is a rectangular box with an opening 51a, a discharge outlet 52 provided at a lowest portion of the vacuum chamber 51, a pressure gauge 53 provided at a downward side wall in the chamber 51, and guide rollers 19 provided at both sides of the opening 51a.

In the vacuum chamber 51, air is sucked from the discharge outlet 52 by a discharge pump not shown in the drawing. Being on the way transported to the third capstan roller 23 from the inspection head 31, the magnetic tape MT is sucked in the vacuum chamber 51 by a predetermined length from the opening 51a. Meanwhile, a lower end of the tape MT sucked in the chamber 51 is positioned higher than the pressure gauge 53.

The pressure gauge 53 measures a space pressure under the tape MT in the chamber 51, and outputs the measured pressure signal to the third capstan roller controlling unit 55.

The third capstan roller control unit 55 monitors a pressure measured with the pressure gauge 53 and controls a speed of the third capstan roller 23 so that the pressure become constant. That is, when the tension of the tape MT increases, a position of lower end of the tape MT in the vacuum chamber 51 rises, thereby the pressure measured with the pressure gauge 53 being decreased and the speed of the third capstan roller 23 being decreased so as to weaken the tension of the tape MT. On the contrary, when the tension of the tape MT decreases, the position of lower end of the tape MT in the vacuum chamber 51 is lowered, thereby the pressure measured with the pressure gauge 53 being increased. Therefore, the third capstan roller controlling unit 55 increases the speed of the third capstan roller 23 so as to increase the tension of the tape MT.

Thus, the tape MT between the second capstan roller 22 and third capstan roller 23 is controlled constant in tension.

Figure 2:
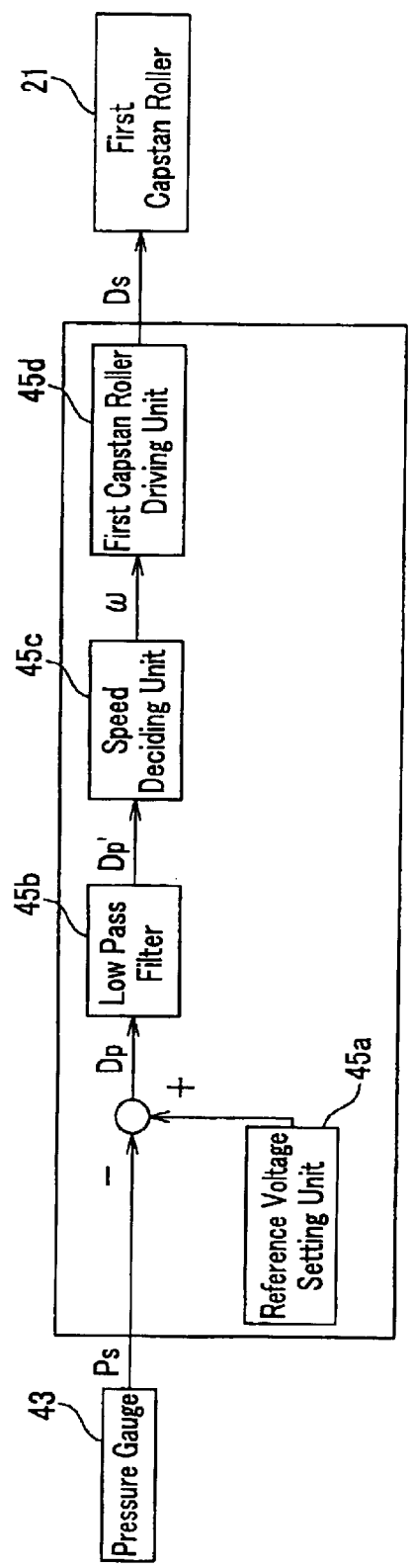
FIG. 2 is a functional block diagram of a first capstan roller control unit.

FIG. 2 is a functional block diagram of the first capstan roller controlling unit 45. As shown in FIG. 2, the roller controlling unit 45 has a reference voltage setting unit 45a, a low pass filter 45b, a speed deciding unit 45c, and a first capstan roller driving unit 45d. The reference voltage setting unit 45a sets a voltage value decided by set tension of the tape MT between the first capstan roller 21 and second capstan roller 22. The pressure signal Ps from the pressure gauge 48 is input in the roller controlling unit 45, a difference Dp for voltage, which is set by the reference voltage setting unit 45a, is obtained, and the signal Ps is output in the low pass filter 45b. Meanwhile, a signal of the difference Dp corresponds to a tension signal in claims of the invention.

The low pass filter 45b is the filter to largely attenuate signals not less than a cut-off frequency. In a drive used for the tape MT, the cut-off frequency is set to be lower than a response frequency by which a head is driven in response to the servo signals. For example, it is desirable to set it a frequency from 100 to 150 Hz.

Meanwhile, the low pass filter 45b may be passed before obtaining the difference Dp so as to attenuate high frequency components of the pressure signal Ps. In the case, the pressure signal Ps corresponds to the tension signal in claims of the invention.

In response to a signal Dp' output from the low pass filter 45b, the speed deciding unit 45c computes a speed to be modified from a rotation speed of the present first capstan roller 21, decides the rotation speed instructing the first capstan roller 21, and outputs a speed signal ω of the capstan roller 21 into the first capstan roller driving unit 45d.

The speed signal ω being input, the first capstan roller driving unit 45d outputs a drive signal Ds driving the capstan roller 21 into it in response to the signal ω.

The third capstan roller controlling unit 55 is also composed same as the first capstan roller controlling unit 45. Meanwhile, it is arbitrary whether or not to provide the roller controlling unit 65 with a low pass filter.

The inspection head 31 is a reproduce head reading servo signals written on the tape MT by the write head 30 and outputs read the servo signals into an inspection unit not shown in the drawing.

The servo writer 10 thus described operates as follows.

In the servo writer 10, the tape MT paid off from the pay-off reel 12 is, being guided with the guide rollers 19, run along a predetermined path by rotation of the first to third capstan rollers 21, 22, and 23, and via recording of the servo signals by the write head 30 and reproducing of them by the inspection head 31, and the tape MT is wound on the winding reel 13.

Then, the tape MT is sucked in the vacuum chamber 41 of the first tension detecting device 40 downstream the first capstan roller 21. The vacuum chamber 41 is discharged from the discharge outlet 42 and when the tension of the tape MT varies, a pressure of a space below the tape MT in the chamber 41 varies. The pressure gauge 43 measures a pressure of the space and outputs into the first capstan roller controlling unit 45. The roller controlling unit 45, as shown in FIG. 2, obtains a difference between the input pressure signal Ps and set voltage by a reference voltage setting unit 45a and a signal Dp of the difference is input in the low pass filter 45b. In the filter 45b, components not less than a predetermined frequency, for example not less than 150 Hz, are attenuated and only those less than 150 Hz remain. A signal Dp' in which high frequencies are cut off is input in the speed deciding unit 45c and the deciding unit 45c decides a rotation speed of the first capstan roller 21 in response to the signal Dp'. A rotation speed ω decided with the deciding unit 45c is converted to electric power driving the capstan roller 21 and it is driven by a drive signal Ds.

According to such the control, the tape MT between the first capstan roller 21 and second capstan roller 22 is controlled so that its tension is modified not more than a predetermined frequency, for example a variation not more than 150 Hz. Accordingly, also in the tape MT sliding on the write head 30, a speed variation occurs a few in a longitudinal direction due to tension vibration not more than 150 Hz. In the write head 30, a pulse signal to write servo signals is input at a predetermined timing and a pattern of the servo signals is written on the tape MT, however due to the speed variation, the pattern is formed as signals with slight distortion in the longitudinal direction of the tape MT.

For example, although FIG. 3 is an example of simplified servo signals, in the case that speed variations exist in the tape MT, some servo signals S with a bottom-open reverse V-shape expand and contract in the longitudinal direction as shown in FIG. 3.

Then, the servo signals are written with the write head 30 and the tape MT passing through the second capstan roller 22, in which written servo signals are read by the inspection head 31, is inspected by an inspection unit not shown in the drawing. Between the second capstan roller 22 and third capstan roller 23, the tension of the tape MT is controlled constant by the second tension detecting device 50, third capstan roller controlling unit 55, and control by the third capstan roller 23, same as the control by the first tension detecting device 40, first capstan roller controlling unit 45, and control by the first capstan roller 21.

The tape MT which has finished the inspection of the servo signals S is wound on the winding reel 13.

In the tape MT in which the servo signals S are thus written by the servo writer 10, being used in a magnetic tape drive, a magnetic head within the magnetic tape drive is controlled based on the servo signals S and a data track DT is formed as shown in FIG. 3 and data is reproduced from the data track DT.

In the example shown in FIG. 3, running directions of the tape MT are lateral directions in FIG. 3 and a position of the magnetic head is judged by a timing when a servo signal reading head intersects a bottom open reverse V-shape, that is, by time when a servo signal reading head intersects a length A in FIG. 3. And the servo signal reading head on the magnetic head is assumed to be controlled so as to intersect the length A in a bottom open V-shape pattern of the servo signals S. Then, for a height intersected at the left pattern in FIG. 3 (up/down position in the drawing), when the right pattern is intersected in FIG. 3, it results in being intersected at a higher position. This is because in the right pattern a speed of the tape MT in writing becomes faster, thereby the pattern expanding in lateral directions (running direction of the tape MT) and having a length of A+δ at a height where the left pattern has a length of A. In the right pattern, a position with a length A becomes a higher position, and as a result that the magnetic head is controlled in a high position, the data track DT is also bendingly formed as shown in FIG. 3.

On the other hand, also in reproducing data, because the magnetic head is controlled same as in recording the data track DT, a reproducing head on the magnetic head can be accurately traced on the track DT.

Thus, if distortion is produced in the servo signals S due to tension variation of the tape MT when they are recorded by the servo writer 10, tension variation of the servo writer 10 has a predetermined frequency not more than a response frequency which a magnetic head of a magnetic tape drive responses based on servo signals, for example a variation of not more than 150 Hz, whereby a data track can similarly be traced in data being recorded and reproduced with the magnetic tape drive. Therefore, if receiving an influence due to the distortion of the servo signals, recording/reproducing errors of data are not caused.

Thus, the servo writer 10 of the invention enables servo signals which are not apt to cause the recording/reproducing errors of data to be written on the tape MT.

Thus, although one of embodiments of the present invention is described, the invention is not limited to such the embodiment and can be embodied in varied forms as needed. For example, a tension detecting means is not limited to the means which pulls in a magnetic tape in a vacuum chamber and detects a negative pressure within a vacuum chamber, and any tension detecting means such as one in which a load cell is provided at a supporting shaft of a guide roller and detects tension from weight, which burdens the guide roller, measured with the load cell.

In addition, although the embodiment takes up a magnetic tape as an example, being not limited to the magnetic tape it is also applicable to a recording medium recording data by light and the like.

Moreover, although the embodiment is designed to control the rotation speed of the first capstan roller 21 in response to the tension of the magnetic tape MT measured with the first tension detecting device 40, it can also be composed to control the rotation speed of the second capstan roller 22.

Next, an example showing a usefulness of low pass filter in the embodiment is described. A tension signal which is a measured tension of a magnetic tape is passed through a low pass filter (with an attenuation of 3 dB in 150 Hz for an input signal) with a cut-off frequency of 150 Hz. Then, using a servo writer with a tension controlling mechanism controlling tension based on signals after the high frequency signals being cut off, the servo signals are written in a sample magnetic tape and a position error signal (PES) is measured. The PES calculates a relative position of the magnetic tape and magnetic head in a state, in which a tracking servo making a magnetic head follows the servo signals is being performed, by detecting where a read element is reading based on read signals which the read element reading the servo signals. That is, the smaller (smaller variation) a value of the PES, it is seen that the magnetic head can follow the servo signals.

Figure 4A:
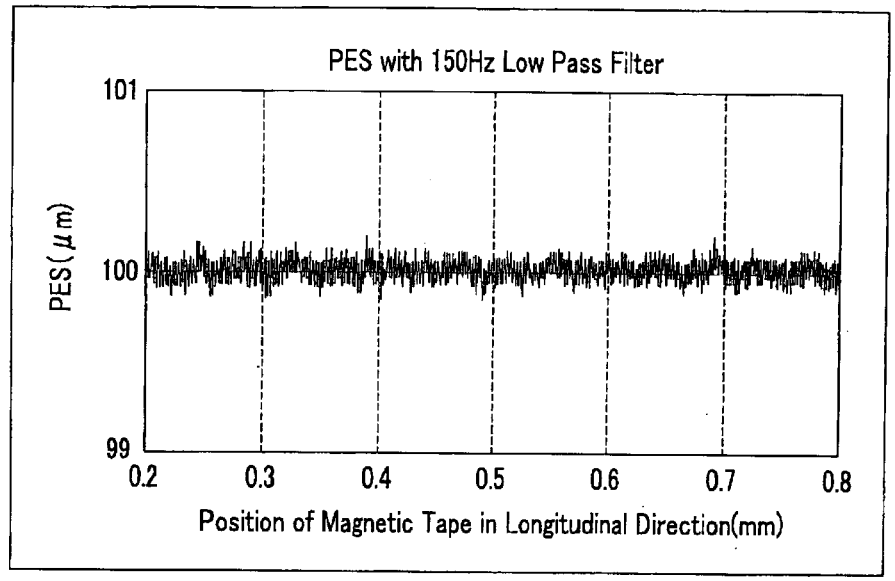
FIG. 4A is a graph showing a measurement result of a PES related to the invention and FIG. 4B is another graph showing a measurement result of the PES when a low pass filter is removed.

FIG. 4A is a graph showing a result of PES of embodiment of the invention. In the draw, a horizontal axis shows a position of a magnetic tape and a vertical axis shows a PES value. Meanwhile, in a vertical value, a position of 100 $\mu$m is made as a reference position, so a deviation from 100 $\mu$m corresponds to an amount which the magnetic head cannot follow servo signals. As shown in FIG. 4, in the embodiment of the invention, the PES is measured at an amplitude of about 0.1 $\mu$m.

Figure 4B:
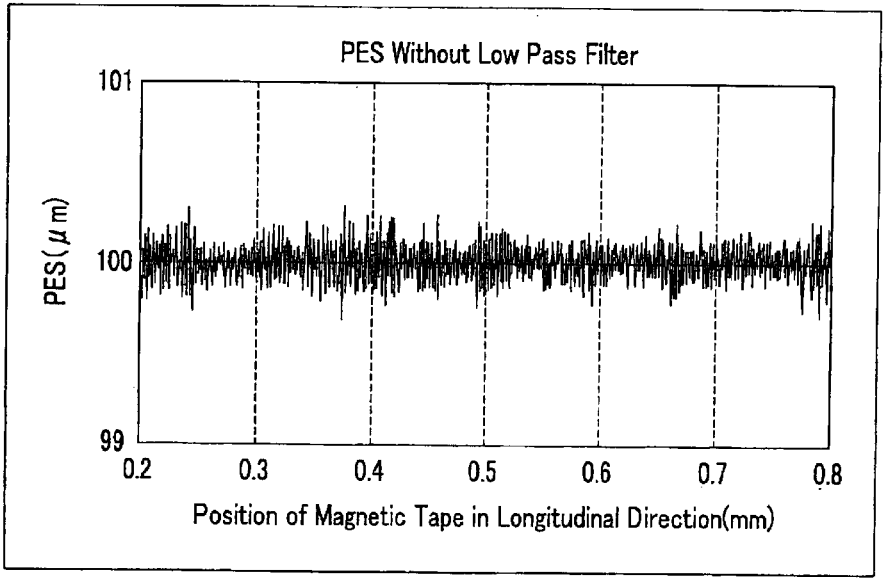

On the other hand, removing the low pass filter from the servo writer, demagnetizing the entirely same magnetic tape, and measuring the PES at the same portion of the magnetic tape, the result is FIG. 4B. Meanwhile, although the low pass filter is removed, signals of high frequencies from a configuration of a circuit tend to attenuate, and in an experiment device, there exist 3 dB and 5 dB of attenuations in 300 Hz and 500 Hz, respectively. As shown in FIG. 4B, without the low pass filter, the PES is measured at an amplitude of around 0.2 µm.

Thus, according to the embodiment, when the tension of a magnetic tape in a servo writer is controlled, by attenuating tension signals not less than 150 Hz, it is proved that the PES is lowered, that is, a tracking ability of a magnetic head becomes better.

What is claimed is:

1. A servo writer which writes a servo signal on a tape, which is paid off from a pay-off reel provided at an upstream side of a write head and is wound on a winding reel provided at a downstream side of said write head, by said write head, the writer comprising:

a pay-off side motor paying off the tape from the pay-off reel by rotating said pay-off reel;

a winding side motor winding the tape on the winding reel by rotating said winding reel;

a first capstan roller and second capstan roller which are provided at the upstream side and down stream side of said write head, respectively, and by rotating the capstan rollers, run the tape in a state pinched between respective pinch rollers and the capstan rollers;

a first tension detecting means which is provided between said first capstan roller and said second capstan roller and detects running tape tension; and a capstan roller controlling unit controlling a rotation speed of said first capstan roller and said second capstan roller so that tension detected by said first tension detecting means becomes constant, wherein said capstan roller controlling unit has a low pass filter attenuating a high frequency component of a tension signal detected by said first tension detecting means.

2. A servo writer according to claim 1, wherein said first tension detecting means pulls in said tape in a vacuum chamber and detects tape tension by a negative pressure in the vacuum chamber.

3. A servo writer according to claim 1, wherein a cut-off frequency of said low pass filter is lower than a response frequency by which a head in a tape drive in which said tape is used is driven in response to a servo signal.

4. A servo writer according to claim 2, wherein a cut-off frequency of said low pass filter is lower than a response frequency by which a head in a tape drive in which said tape is used is driven in response to a servo signal.

5. A servo writer according to claim 1, wherein the cut-off frequency of said low pass filter is not less than 100 Hz and not more than 150 Hz.

6. A servo writer according to claim 2, wherein the cut-off frequency of said low pass filter is not less than 100 Hz and not more than 150 Hz.

7. A servo writer according to claim 1, wherein a second tension detecting device is provided at a downstream side of said second capstan roller and a third capstan roller is provided at a downstream side of the second tension detecting device.

8. A servo writer according to claim 7, wherein said first tension detecting means and said second tension detecting means pull in said tape in vacuum chambers and detect tape tension by a negative pressure in the vacuum chambers.

9. A servo writer according to claim 7, wherein the cut-off frequency of said low pass filter is lower than a response frequency by which a head in a tape drive in which said tape is used is driven in response to a servo signal.

10. A servo writer according to claim 8, wherein the cut-off frequency of said low pass filter is lower than a response frequency by which a head in a tape drive in which said tape is used is driven in response to a servo signal.

11. A servo writer according to claim 7, wherein the cut-off frequency of said low pass filter is not less than 100 Hz and not more than 150 Hz.

12. A servo writer according to claim 8, wherein the cut-off frequency of said low pass filter is not less than 100 Hz and not more than 150 Hz.

13. A servo writer according to claim 7, wherein an inspection head reading a servo signal written by said write head is provided between said second capstan roller and said second tension detecting device.

14. A servo writer according to claim 8, wherein an inspection head reading a servo signal written by said write head is provided between said second capstan roller and said second tension detecting device.

15. A servo writer according to claim 9, wherein an inspection head reading a servo signal written by said write head is provided between said second capstan roller and said second tension detecting device.

16. A servo writer according to claim 10, wherein an inspection head reading a servo signal written by said write head is provided between said second capstan roller and said second tension detecting device.

17. A servo writer according to claim 11, wherein an inspection head reading a servo signal written by said write head is provided between said second capstan roller and said second tension detecting device.

18. A servo writer according to claim 12, wherein an inspection head reading a servo signal written by said write head is provided between said second capstan roller and said second tension detecting device.

19. A servo writer according to claim 1, wherein said tape is a magnetic tape.

20. A servo writer according to claim 2, wherein said tape is a magnetic tape.

* * * * *